United States Patent
Iketaka et al.

(10) Patent No.: US 9,360,044 B2
(45) Date of Patent: Jun. 7, 2016

(54) RADIAL NEEDLE BEARING

(75) Inventors: Goshi Iketaka, Tokyo (JP); Shinichi Takahashi, Tokyo (JP); Takayuki Hagita, Tokyo (JP); Akinori Yoshioka, Tokyo (JP); Takeshi Hirano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 641 days.

(21) Appl. No.: 12/878,526

(22) Filed: Sep. 9, 2010

(65) Prior Publication Data
US 2011/0268380 A1    Nov. 3, 2011

(30) Foreign Application Priority Data
Apr. 30, 2010   (JP) ................................ 2010-105200

(51) Int. Cl.
     *F16C 33/24*      (2006.01)
     *F16C 19/46*      (2006.01)
     *F16C 33/34*      (2006.01)

(52) U.S. Cl.
CPC .................. *F16C 19/46* (2013.01); *F16C 33/34* (2013.01); *F16C 2240/50* (2013.01); *F16C 2360/42* (2013.01)

(58) Field of Classification Search
CPC .. F16C 2240/50; F16C 19/46; F16C 2360/42; F16C 33/34
USPC ............................................ 384/548, 565, 568
See application file for complete search history.

(56) References Cited

U.S. PATENT DOCUMENTS

| | | | | |
|---|---|---|---|---|
| 4,050,130 A | * | 9/1977 | Pitner | 29/898.07 |
| 4,802,831 A | * | 2/1989 | Suefuji et al. | 418/55.2 |

(Continued)

FOREIGN PATENT DOCUMENTS

| | | |
|---|---|---|
| JP | 2002-357224 A | 12/2002 |
| JP | 2005-201072 A | 7/2005 |

(Continued)

OTHER PUBLICATIONS

Machine translation of JP 2002-357224 from JPO website.*

(Continued)

*Primary Examiner* — Alan B Waits
(74) *Attorney, Agent, or Firm* — Westerman, Hattori, Daniels & Adrian, LLP

(57) ABSTRACT

In rollers used in a radial needle bearing, the circularity of crowning sections provided at opposite ends of each roller is 0.6 μm or smaller. This allows for reduction of sound (noise) produced when the radial needle bearing rotates by itself and can also allow for reduction of sound (noise) of a rotational machine when the radial needle bearing is installed and rotates therein.

8 Claims, 4 Drawing Sheets

(56) References Cited

U.S. PATENT DOCUMENTS

| | | | |
|---|---|---|---|
| 6,196,724 B1* | 3/2001 | Murai et al. | 384/450 |
| 6,315,458 B1* | 11/2001 | Unno et al. | 384/565 |
| 6,318,897 B1* | 11/2001 | Shitsukawa et al. | 384/450 |
| 6,460,498 B2* | 10/2002 | Harimoto et al. | 123/90.41 |
| 6,843,605 B2* | 1/2005 | Tamada et al. | 384/618 |
| 7,828,484 B2* | 11/2010 | Hofmann et al. | 384/568 |
| 8,398,312 B2* | 3/2013 | Fujiwara | 384/568 |
| 8,414,194 B2* | 4/2013 | Ito | 384/565 |
| 2002/0009248 A1* | 1/2002 | Ito | 384/537 |
| 2004/0076356 A1* | 4/2004 | Kapaan et al. | 384/544 |
| 2007/0172168 A1* | 7/2007 | Oishi et al. | 384/569 |
| 2009/0169145 A1* | 7/2009 | Obayashi et al. | 384/450 |
| 2010/0098364 A1* | 4/2010 | Ohashi | 384/450 |
| 2014/0270613 A1* | 9/2014 | Iketaka et al. | 384/462 |

FOREIGN PATENT DOCUMENTS

| | | |
|---|---|---|
| JP | 2005-308138 A | 11/2005 |
| JP | 2009-191982 A | 8/2009 |
| JP | 2009-293523 A | 12/2009 |

OTHER PUBLICATIONS

Japanese Office Action dated Feb. 28, 2012, issued in corresponding Japanese Patent Application No. 2010-105200.

European Search Report dated Jun. 27, 2012, issued in corresponding European Patent Application No. 10176166.6.

Deutsche, Norman; "DIN 5402-3 : Walzlager—Walzlagerteile—Nadelrollen"; vol. 5402-3, Mar. 1, 1993, pp. 163-166, XP009160020. (cited in European Search Report dated Jun. 27, 2012).

Japanese Notice to Grant dated Nov. 6, 2012, issued in corresponding Japanese Patent Application No. 2010-105200, (3 pages).

Communication under Rule 71(3) EPC (Invitation to pay the fee for grant) dated Feb. 9, 2016, issued in counterpart European Patent Application No. 10176166.6. An explanation of relevance: "The Communication to Grant a Patent has been received". (9 pages).

* cited by examiner

RADIAL NEEDLE BEARING

CROSS REFERENCE TO RELATED APPLICATIONS

This application claims benefit of Japanese Application No. 2010-105200 filed in Japan on Apr. 30, 2010, the content of which is hereby incorporated by its reference.

BACKGROUND OF THE INVENTION

1. Field of the Invention

The present invention relates to radial needle bearings suitably used in, for example, rotational machines, such as electric compressors.

2. Description of Related Art

A known example of a rotational machine equipped with a radial needle bearing is an electric compressor disclosed in Japanese Unexamined Patent Application, Publication No. 2009-293523.

In recent years, there has been a further demand for reducing sound (noise) produced when a rotational machine, such as an electric compressor, is rotated.

BRIEF SUMMARY OF THE INVENTION

The present invention has been made in view of the circumstances described above, and an object thereof is to provide a radial needle bearing that allows for reduction of sound (noise) produced when it rotates by itself and that can also allow for reduction of sound (noise) of a rotational machine when the radial needle bearing is installed and rotates therein.

In order to achieve the aforementioned object, the present invention provides the following solutions.

In rollers used in a radial needle bearing according to a first aspect of the present invention, the circularity of crowning sections provided at opposite ends of each roller is 0.6 μm or smaller.

With the rollers for a radial needle bearing according to the first aspect of the present invention, when the sound, which was produced by the radial needle bearing fitted with the rollers therefor while rotating the radial needle bearing by itself, was measured, it was demonstrated that the rotation sound (noise) can be reduced as compared with a radial needle bearing fitted with rollers therefor, in which the circularity of crowning sections provided at opposite ends thereof is between 1.1 μm and 1.5 μm.

A radial needle bearing according to a second aspect of the present invention includes the aforementioned rollers for the radial needle bearing.

With the radial needle bearing according to the second aspect of the present invention, when the sound, which was produced by the radial needle bearing fitted with the rollers therefor while rotating the radial needle bearing by itself, was measured, it was demonstrated that the rotation sound (noise) can be reduced as compared with a radial needle bearing equipped with rollers in which the circularity of crowning sections provided at opposite ends thereof is between 1.1 μm and 1.5 μm.

A rotational machine according to a third aspect of the present invention includes the aforementioned radial needle bearing.

With the rotational machine (e.g., electric compressor) according to the third aspect of the present invention, when the sound, which was produced by the rotational machine fitted with the aforementioned radial needle bearing while rotating the rotational machine, was measured, the results shown in FIG. 4 were obtained. Specifically, with the rotational machine according to the present invention, the rotation sound (noise) can be reduced by about 3.5 dB as compared with a rotational machine fitted with a radial needle bearing that includes rollers therefor, in which the circularity of crowning sections provided at opposite ends thereof is between 1.1 μm and 1.5 μm.

The radial needle bearing according to the present invention advantageously allows for reduction of sound (noise) produced when it rotates by itself and can also allow for reduction of sound (noise) of a rotational machine when the radial needle bearing is installed and rotates therein.

DETAILED DESCRIPTION OF THE INVENTION

A radial needle bearing according to an embodiment of the present invention will be described below with reference to FIGS. 1 to 4.

Figure 1:
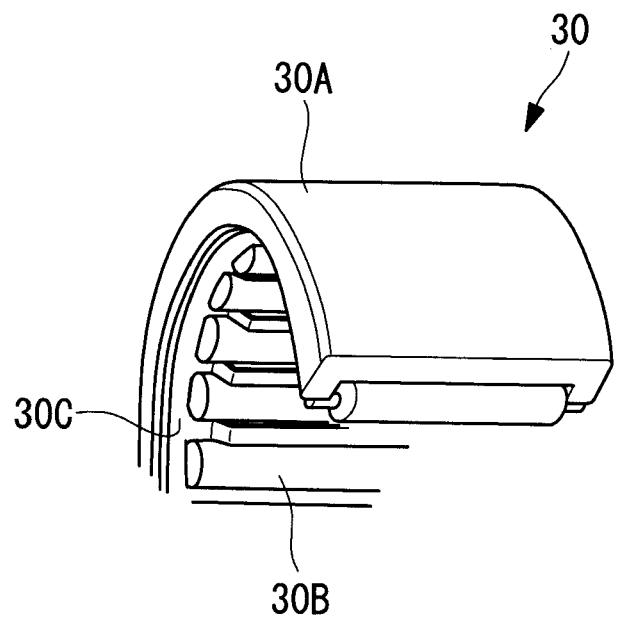
FIG. 1 is a partially-cutaway perspective view of a radial needle bearing according to an embodiment of the present invention.
Figure 2A:
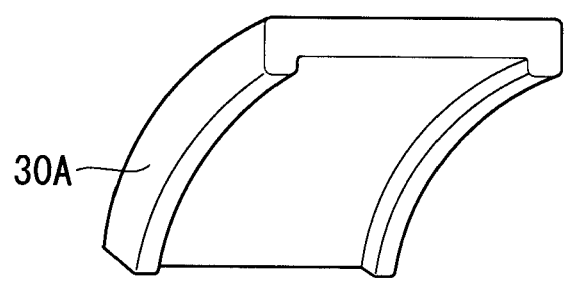
FIG. 2A is a perspective view showing a part of an outer ring of the radial needle bearing according to the embodiment of the present invention.
Figure 2B:
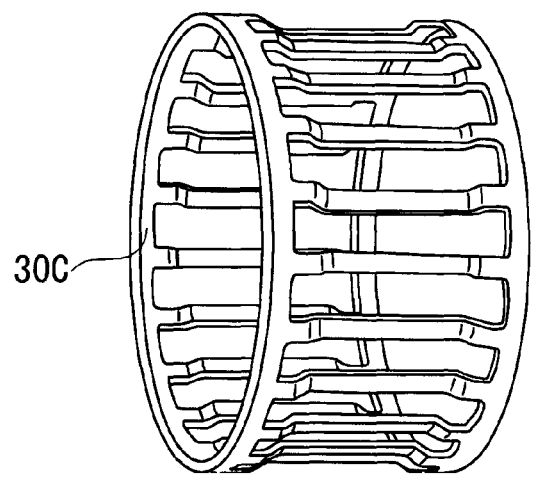
FIG. 2B is a perspective view showing an entire cage of the radial needle bearing according to the embodiment of the present invention.
Figure 2C:
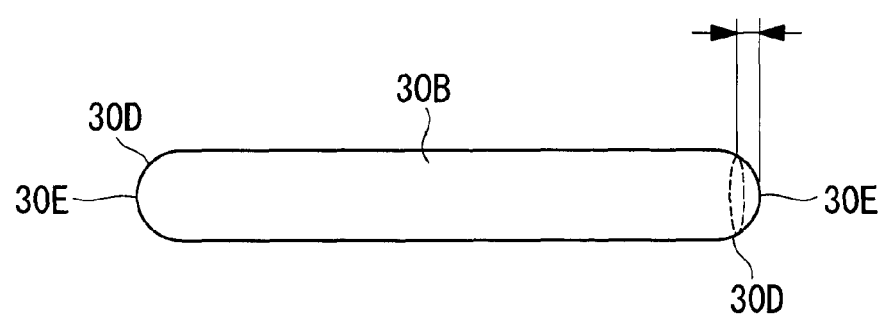
FIG. 2C is a plan view of an entire roller of the radial needle bearing according to the embodiment of the present invention.
Figure 3:
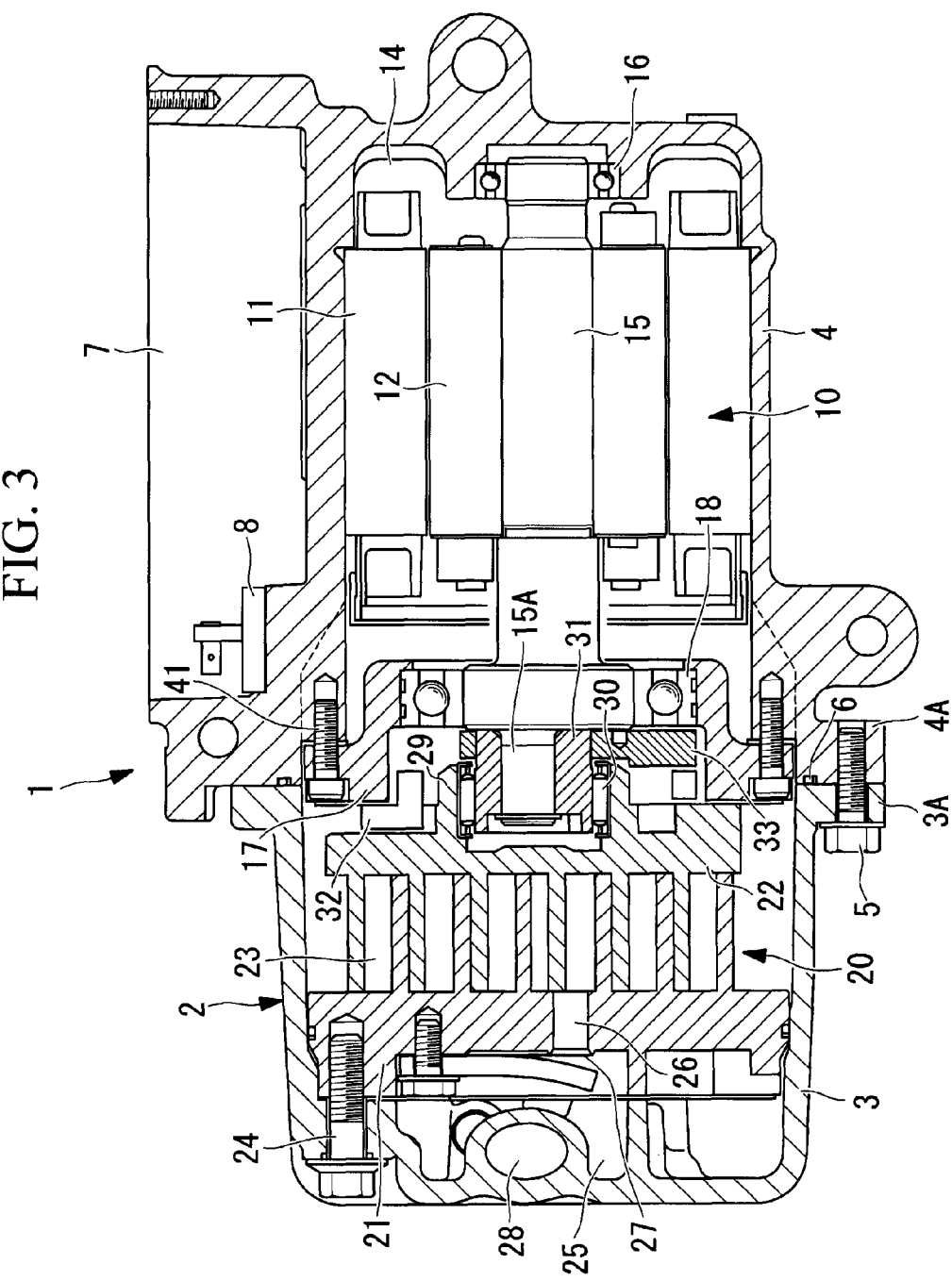
FIG. 3 is a cross-sectional view of an electric compressor equipped with the radial needle bearing according to the embodiment of the present invention.
Figure 4:
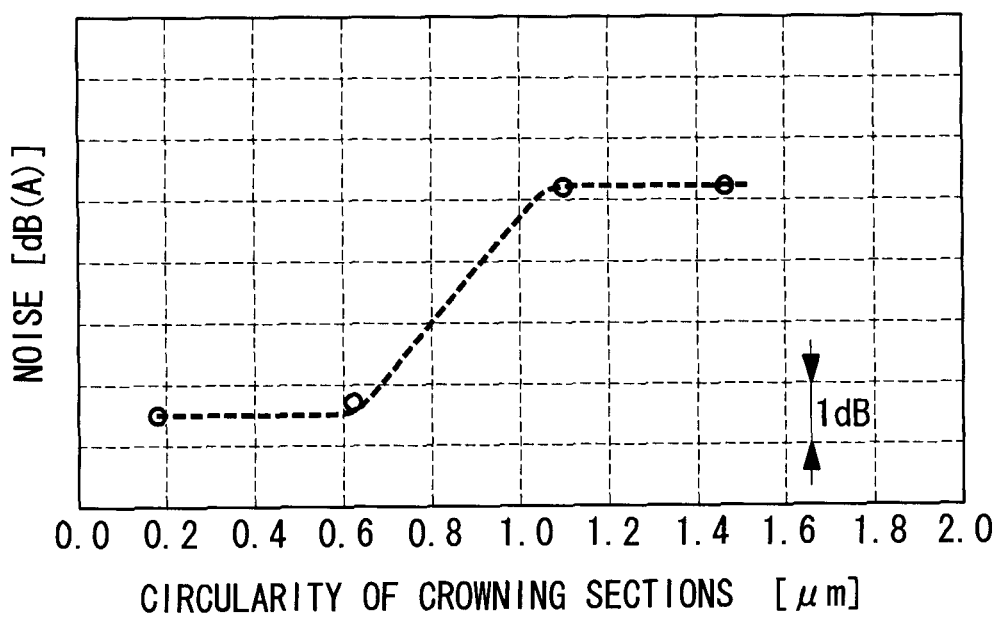
FIG. 4 is a graph for explaining the advantages of the electric compressor equipped with the radial needle bearing according to the embodiment of the present invention.

FIG. 1 is a partially-cutaway perspective view of the radial needle bearing according to this embodiment. FIGS. 2A to 2C are exploded views of the radial needle bearing according to this embodiment. Specifically, FIG. 2A is a perspective view showing a part of an outer ring, FIG. 2B is a perspective view showing an entire cage, and FIG. 2C is a plan view of an entire roller. FIG. 3 is a cross-sectional view of an electric compressor equipped with the radial needle bearing according to this embodiment. FIG. 4 is a graph for explaining the advantages of the electric compressor equipped with the radial needle bearing according to this embodiment.

A radial needle bearing 30 according to this embodiment is a bearing suitable for use in, for example, an electric compressor (rotational machine) 1, as shown in FIG. 3.

As shown in FIG. 3, the electric compressor 1 includes a cylindrical housing 2 that constitutes an outer shell. The housing 2 is constituted of a compressor housing 3 and a motor housing 4 that are both formed into a bowl shape by aluminum die-casting, and is formed by joining together flanges 3A and 4A thereof, respectively, with an O-ring 6 therebetween by using bolts 5.

An upper outer-peripheral surface of the motor housing 4 is integrally provided with an inverter accommodating section 7, and an inverter device (not shown) that converts direct-current power supplied from a high-voltage power source to three-phase alternating-current power and feeds the power to an electric motor 10 provided within the motor housing 4 via a glass-sealed terminal 8 is accommodated in the inverter accommodating section 7.

The inverter device may be of a known type, and a detailed description thereof will be omitted here.

The electric motor 10 provided within the motor housing 4 is constituted of a stator 11 and a rotor 12, and the stator 11 is fixed to an inner peripheral surface of the motor housing 4 by press-fitting or the like. Refrigerant channels (not shown) extending in the axial direction through multiple locations in the circumferential direction are provided between the stator 11 and the motor housing 4. Through these refrigerant channels, a refrigerant taken into a space 14, located between the base of the motor housing 4 and an end surface of the electric motor 10, from a refrigerant intake port (not shown) provided at a rear end (i.e., a right end in FIG. 3) of the motor housing 4 can flow in the axial direction toward the front side (i.e., the left side in FIG. 3).

A rotating shaft (crankshaft) 15 is integrally joined to the rotor 12, and a rear end of this rotating shaft 15 is rotatably supported by a bearing 16 provided at the base of the motor housing 4, whereas a front end thereof is rotatably supported by a main bearing (bearing) 18 provided in a bearing support member 17. The front end of the rotating shaft 15 is provided with a crankpin 15A at a position decentered from the axis of the rotating shaft 15 by a predetermined dimension $\rho$.

The bearing support member 17 is securely supported by the motor housing 4 by means of bolts 41.

On the other hand, a scroll compression mechanism 20 is provided within the compressor housing 3. This scroll compression mechanism 20 is a known compression mechanism formed by engaging a fixed scroll member 21 and orbiting scroll member 22 pair with each other, and is configured to compress a refrigerant gas by causing a compression chamber 23 formed between the scroll members 21 and 22 to be displaced while reducing its volume from the outer periphery toward the center due to an orbiting motion of the orbiting scroll member 22.

The fixed scroll member 21 is fixed to the base of the compressor housing 3 by means of a bolt 24, and a discharge chamber 25 is formed between a back surface of an end plate of the fixed scroll member 21 and the base of the compressor housing 3. The refrigerant gas compressed to a high-temperature high-pressure state is discharged into this discharge chamber 25 from the compression chamber 23 via a discharge hole 26 and a discharge valve 27, and this refrigerant gas is discharged outward from the discharge chamber 25 via a discharge port 28.

A back surface of an end plate of the orbiting scroll member 22 is supported by a thrust surface of the bearing support member 17, and the crankpin 15A of the rotating shaft 15 is linked with a boss section 29, provided at the back surface of the end plate, via the needle bearing 30 and a drive bush 31. Rotation of the rotating shaft 15 causes the orbiting scroll member 22 to revolve in an orbit based on an orbital radius $\rho$ relative to the fixed scroll member 21. The orbiting scroll member 22 is prevented from self-rotating by an Oldham ring 32 interposed between the back surface of the end plate and the bearing support member 17.

The drive bush 31 is integrally provided with a balance weight 33 for cancelling out an unbalanced load occurring when the orbiting scroll member 22 is driven in an orbit.

As shown in FIG. 1 and FIGS. 2A to 2C, the radial needle bearing 30 according to this embodiment is constituted of a cylindrical outer ring 30A, a plurality of (needle-shaped) rollers 30B disposed inside the outer ring 30A, and a cage 30C that holds these rollers 30B at a predetermined pitch.

In this embodiment, a radial clearance (outer-ring orbital diameter (outer-ring inner diameter)−inner-ring orbital diameter (inner-ring inner diameter)−2×roller outer-diameter) is set between 10 µm and 30 µm.

The outer ring 30A and the cage 30C may be of known types, and detailed descriptions thereof will be omitted here.

Regarding each roller 30B, the circularity of crowning sections 30D provided at opposite ends thereof is 0.6 µm or smaller (0.2 µm or greater, or 0.0 µm or greater). A radial needle bearing fitted with rollers in which the circularity, measured at positions corresponding to 10% to 20% of the overall length of each roller 30B from extremities 30E thereof, is varied within a range between 0.2 µm and 1.5 µm was rotated by itself so as to measure the sound produced by the radial needle bearing. As a result, with the radial needle bearing 30 according to this embodiment, the rotation sound (noise) can be reduced as compared with a radial needle bearing fitted with rollers in which the circularity of the crowning sections 30D provided at the opposite ends thereof is between 1.1 µm and 1.5 µm.

On the other hand, an electric compressor fitted with a radial needle bearing that includes rollers in which the circularity, measured at positions corresponding to 10% to 20% of the overall length of each roller 30B from extremities 30E thereof, is varied within a range between 0.2 µm and 1.5 µm was rotated so as to measure the sound produced by the electric compressor. The results obtained are shown in FIG. 4. Specifically, with the electric compressor 1 fitted with the radial needle bearing 30 that includes the rollers 30B according to this embodiment, the rotation sound (noise) can be reduced by about 3.5 dB as compared with an electric compressor fitted with a radial needle bearing that includes rollers in which the circularity of the crowning sections 30D provided at the opposite ends thereof is between 1.1 µm and 1.5 µm.

With the radial needle bearing 30 according to this embodiment, after measuring the sound produced by the radial needle bearing 30 fitted with the rollers 30B while rotating the radial needle bearing 30 by itself, it was demonstrated that the rotation sound (noise) can be reduced as compared with a radial needle bearing equipped with rollers in which the circularity of crowning sections provided at opposite ends thereof is between 1.1 µm and 1.5 µm.

Furthermore, with the electric compressor 1 equipped with the radial needle bearing 30 according to this embodiment, after measuring the sound produced by the electric compressor 1 fitted with the radial needle bearing 30 while rotating the electric compressor 1, the results shown in FIG. 4 were obtained. Specifically, with the electric compressor 1 equipped with the radial needle bearing 30 according to this embodiment, the rotation sound (noise) can be reduced by about 3.5 dB as compared with an electric compressor fitted with a radial needle bearing that includes rollers in which the circularity of crowning sections provided at opposite ends thereof is between 1.1 µm and 1.5 µm.

The present invention is not limited to the above-described embodiment, and modifications and alterations are permissible where appropriate.

Furthermore, the present invention is applicable not only to electric compressors but also to other rotational machines that require a radial needle bearing.

What is claimed is:
1. A rotational machine, comprising:
a shaft;
a radial needle bearing, the radial needle bearing having a positive radial clearance comprising:
rollers used in the radial needle bearing;
a cage that holds the rollers at a predetermined pitch; and
a cylindrical outer ring that accommodates the rollers and the cage therein,
wherein the circularity of crowning sections provided at opposite ends of each roller is 0.6 µm or smaller, and wherein the radial needle bearing supports the shaft of the rotational machine.

2. A rotational machine according to claim 1, wherein the positive radial clearance is between 10 μm and 30 μm.

3. A rotational machine according to claim 1, wherein the radial needle bearing is attached such that an outer peripheral surface of the outer ring comes into contact with an inner peripheral surface of a boss section provided at a back surface of an end plate of an orbiting scroll member.

4. A rotational machine according to claim 1, wherein an area load applied to the rollers is varied over time.

5. A rotational machine according to claim 1, wherein the shaft is provided with a crank mechanism at a position decentered from the axis of the shaft.

6. A rotational machine according to claim 1, further comprising: an orbiting scroll member having a self-rotating prevention mechanism.

7. A rotational machine according to claim 5, further comprising: an orbiting scroll member having a self-rotating prevention mechanism.

8. A rotational machine according to claim 1, wherein the rollers have straight portions.

* * * * *